United States Patent [19]

Johnson

[11] Patent Number: 5,694,416

[45] Date of Patent: Dec. 2, 1997

[54] DIRECT SEQUENCE SPREAD SPECTRUM RECEIVER AND ANTENNA ARRAY FOR THE SIMULTANEOUS FORMATION OF A BEAM ON A SIGNAL SOURCE AND A NULL ON AN INTERFERING JAMMER

[75] Inventor: Russell K. Johnson, Half Moon Bay, Calif.

[73] Assignee: Radix Technologies, Inc., Mountain View, Calif.

[21] Appl. No.: 393,716

[22] Filed: Feb. 24, 1995

[51] Int. Cl.[6] .................... H04B 15/00; H04K 1/00; H04L 27/30

[52] U.S. Cl. .................... 375/206; 375/347; 342/368

[58] Field of Search .................... 375/200, 202, 375/206, 207, 208, 316, 317, 346, 348, 349, 350, 280, 267, 347; 342/359, 361, 362, 368, 378; 455/132, 137

[56] References Cited

U.S. PATENT DOCUMENTS

| | | | |
|---|---|---|---|
| 4,280,128 | 7/1981 | Masak | 343/100 LE |
| 4,800,390 | 1/1989 | Searle | 342/383 |
| 5,248,982 | 9/1993 | Reinhardt et al. | 342/375 |
| 5,274,383 | 12/1993 | Godet | 342/373 |
| 5,455,592 | 10/1995 | Huddle | 342/359 |
| 5,541,606 | 7/1996 | Lennen | 342/357 |

Primary Examiner—Vesfaldet Bocure
Assistant Examiner—Bryan Webster
Attorney, Agent, or Firm—Thomas E. Schatzel; Law Offices of Thomas E. Schatzel a Prof. Corporation

[57] ABSTRACT

A navigation satellite receiver that nulls interference and enhances satellite signals using differences in their spatial positions and that includes four antennas in a spatial array respectively connected to four amplitude and phase balanced receiver downconverter channels. Five satellite tracking channels are each connected to all four receiver channels and each includes despreaders and I/Q accumulators for early, late and punctual correlation. The despreader and accumulator combinations provide four-by-one vectors called aperture estimates. A code-gated maximum likelihood processor whitens these by multiplication with the mathematical inverse Cholesky factor of the interference data. This vector is generated in a millisecond block "k" and is multiplied by a similarly generated vector formed in a previous millisecond block "k-1". The magnitude of the resulting product is used for code tracking, and the phase of the result provides for carrier tracking.

13 Claims, 4 Drawing Sheets

DIRECT SEQUENCE SPREAD SPECTRUM RECEIVER AND ANTENNA ARRAY FOR THE SIMULTANEOUS FORMATION OF A BEAM ON A SIGNAL SOURCE AND A NULL ON AN INTERFERING JAMMER

This invention was made with Government support under Contract F29601-94-C-0148, awarded by the Department of the Air Force. The Government has certain rights in the invention.

BACKGROUND OF THE INVENTION

1. Field of the Invention

The present invention relates generally to radio communications and more specifically to equipment and methods for increasing the signal-to-interference-plus-noise ratio of global positioning system (GPS) receivers in the presence of hostile or unintentional jamming of navigation frequencies.

2. Description of the Prior Art

Directional antennas, such as multi-element Yagi's commonly used for television broadcast reception, have forward lobes or beams that can increase the signal level to a receiver when the beam is aimed at the signal transmitter. Such antennas also typically have nulls, e.g., at their sides, that can be positioned to desensitize reaction to unwanted signals, based on their direction of arrival. For example, ghosts in television pictures are caused by reflected signals, and such can be rejected by carefully aiming a directional antenna.

Satellite navigation systems can also benefit from equipping receivers with directional antennas. However, the orbiting satellites that transmit the ranging signals can be at any azimuth angle and at any elevation above zero degrees. So hemispherical microwave patch antennas have become common, because they can receive signals from satellites with random positions in the sky.

Satellite navigation has become so highly developed that three-dimensional positions can be determined by navigation satellite receivers in real-time, with updated position fixes occurring more frequently than ten hertz. Furthermore, the technology has developed such that the positions determined are precise to just a few centimeters.

The United States' launched navigation satellite system, the global positioning system (GPS), has been proven to afford military applications to navigation satellite systems, e.g., weapons guidance. However, electronic countermeasures (ECM) have developed that include navigation frequency interference jammers that degrade the signal-to-interference-plus-noise ratio (SINR) for a navigation satellite receiver so low that operation is unreliable or impossible.

Several spatial interference cancellation techniques have been applied to prior art GPS receivers to combat hostile jamming. Null steering technologies, such as controlled reception pattern antenna (CRPA) and antenna electronics (AE), use an adaptive antenna array to simply null all energy perceived above the thermal noise floor. The GPS signal is direct sequence spread spectrum (DSSS) and lies below the thermal noise floor. These prior art null-steering technologies often inadvertently steer the null at the expense of the signal of interest. Such unmanaged signal-to-interference-plus-noise ratio (SINR) causes the signal tracking of satellites to become unreliable and a loss of tracking can cost valuable time in attempts to re-acquire the lost satellite. Once lost, re-acquisition may also be impossible.

SUMMARY OF THE INVENTION

It is therefore an object of the present invention to provide a radio receiver with an adaptive antenna array that simultaneously maximizes signal and minimizes jamming noise.

It is a further object of the present invention to provide a navigation satellite receiver that will generate navigation solutions in the presence of severe interference.

It is another object of the present invention to provide a navigation satellite receiver that will generate navigation solutions in the presence of severe interference and while on-board a rolling aircraft.

Briefly, a navigation satellite receiver embodiment of the present invention nulls interference and enhances satellite signals using differences in their spatial positions and includes four antennas in a spatial array respectively connected to, four amplitude and phase balanced receiver downconverter channels. Five satellite tracking channels are each connected to all four receiver channels and each includes despreaders and I/Q accumulators for early, late and punctual correlation. The despreader and accumulator combinations provide four-by-one vectors called aperture estimates. A code-gated maximum likelihood processor whitens these by multiplication with the mathematical inverse Cholesky factor of the interference data. This vector is generated in a millisecond block "k" and is multiplied by a similarly generated vector formed in a previous millisecond block "k-1". The magnitude of the resulting product is used for code tracking, and the phase of the result provides for carrier tracking.

An advantage of the present invention is that a radio receiver is provided with an adaptive antenna array that simultaneously maximizes signal and minimizes jamming noise systems, and achieves a minimum of fifty decibel nulls against narrow band jammers and forty-five decibel nulls against wideband jammers.

Another advantage of the present invention is that a navigation satellite receiver is provided that will generate navigation solutions in the presence of severe interference, e.g., interference from swept continuous wave (CW), pulsed CW, narrow band noise, broadband twenty MHz noise and noncoherent CW.

A further advantage of the present invention is that a navigation satellite receiver is provided that will generate navigation solutions in the presence of severe interference while on-board a rolling aircraft.

These and other objects and advantages of the present invention will no doubt become obvious to those of ordinary skill in the art after having read the following detailed description of the preferred embodiment which is illustrated in the various drawing figures.

THE DRAWINGS

DETAILED DESCRIPTION OF THE PREFERRED EMBODIMENT

Figure 1:
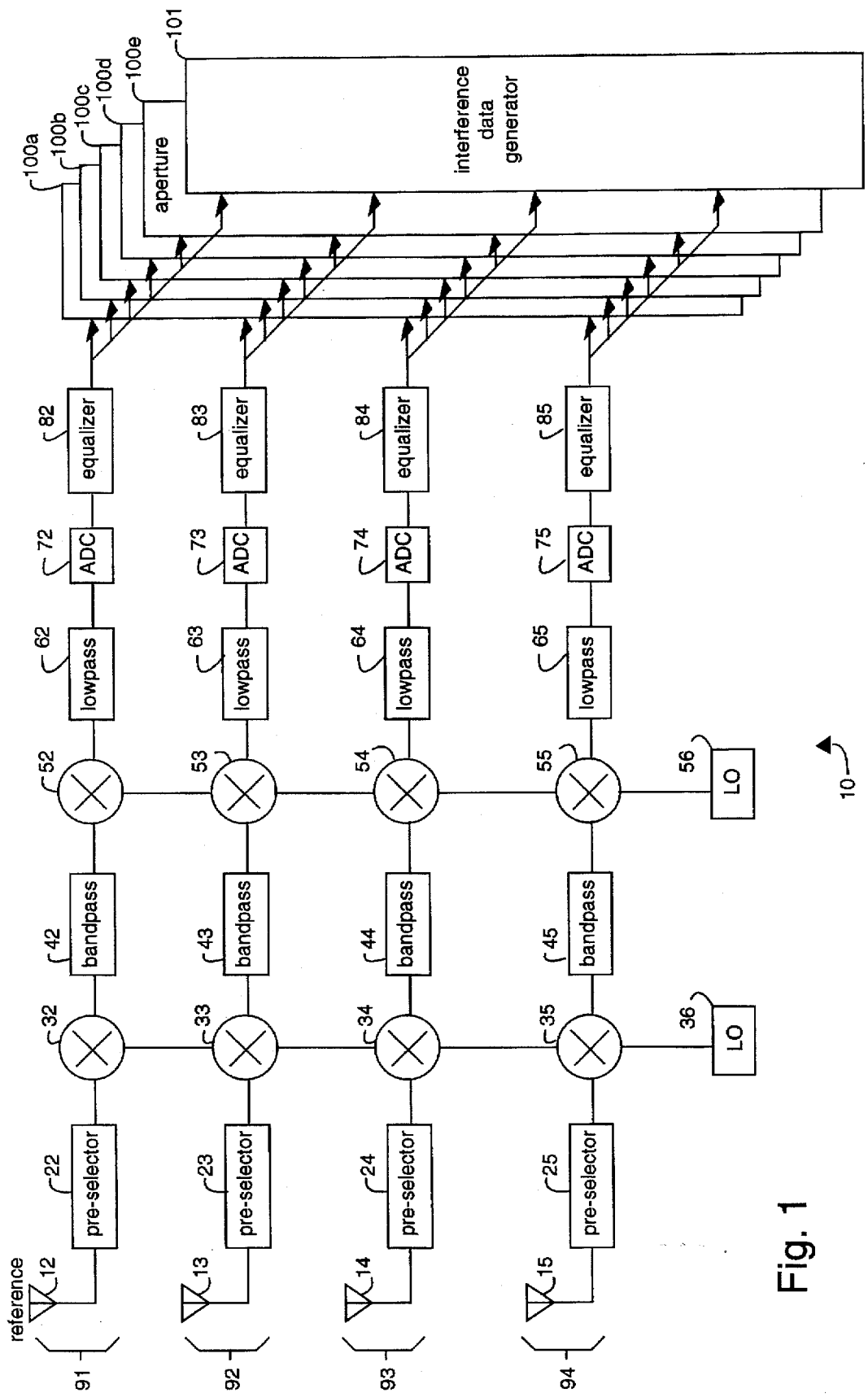
FIG. 1 is a block diagram of four radio frequency downconverter channels of a navigation satellite receiver system embodiment of the present invention.

A navigation satellite receiver system embodiment of the present invention, referred to herein by general reference numeral 10, is illustrated in FIG. 1. System 10 comprises a reference antenna 12, surrounded by a trio of antennas 13–15 positioned one-half wavelength from the reference antenna 12 separated by 120° azimuth. In alternative embodiments, the antennas 12–15 may be randomly placed, and need not remain absolutely fixed in their relation to one another. In another alternative embodiment, seven antennas may be used, which can provide eight decibels of gain in interference-free environments. The antennas 12–15 are microwave patch antennas for the reception of coarse/ acquisition code (C/A-code) and precision code (P-code or Y-code) ranging signals transmitted by orbiting navigation satellites, e.g., global positioning system (GPS) satellites, as supported by the United States. The one-half wavelength separation of the antennas refers to one of the two microwave L-band transmission frequencies of such satellites, e.g., "L1" or "L2", as they are commonly referred to by artisans.

The antennas 12–15 each receive signals from individual satellites in a visible constellation of satellites and a jamming interference from a variety of directions that can vary in real-time. The differences in direction, both in azimuth and in elevation, cause each antenna 12–15 to see a slightly different carrier phase and code phase than its neighbor. The interference cancellation capability is derived from interference measurements made pre-despread, and GPS measurements made post-despread. Pre-despread, the GPS signal lies more than thirty decibels below the noise floor. Consequently, nearly all the energy measured pre-despread is interference or thermal noise. Post-despread, the GPS signal is enhanced more than forty decibels. Since the interference environment is known from pre-despread measurements made by the processor, the interference component of the post-despread signal may be removed. Once code and code phase lock have been achieved, the system 10 adjusts the direct sequence spread spectrum (DSSS) local code phases, one for each signal received by the antennas 12–15, and the carrier phases, to, in effect, aim an antenna array reception pattern null in the direction of a jeer, and independent beams toward each satellite in code phase lock. The net effect, is to maximize the signal-to-interference-plus-noise ratio (SINR) by simultaneously minimizing the jamming interference and maximizing the signal-of-interest.

The signals from the antennas 12–15 are coherently down-converted by a set of four respective pre-selector filters 22–25, a set of four respective first mixers 32–35 connected to a common first local oscillator 36 for coherence, a set of four respective bandpass filters 42–45, a set of four respective second mixers 52–55 connected to a common second local oscillator 56 for coherence, a set of four respective low pass filters 62–65, a set of four respective analog-to-digital converters (ADCs) 72–75 and a set of four respective real-to-complex equalizers 82–85. Preferably, a digital equalizer coefficient process is used in the equalizers 82–85 to filter out the two outside edges of the analog pass band (filters 42–45 and 62–65), which appear as horns in a graph of the group delay versus normalized frequency. Therefore, the analog transition bands are not equalized, they are simply eliminated by digital filtering with digital I/Q generation filters within the equalizers 82–85. The I/Q signal is preferably generated by feeding two parallel finite impulse filters (FIR) in the equalizers 82–85 with the even and odd samples of the received signal.

The down-conversions across the four down converters, labeled as receiver channels 91–94 in FIG. 1, are preferably both phase and amplitude matched. The receiver channel 91 serves as a reference channel for such matching. The ADCs 72–75 sample a down converted intermediate frequency of 10.23 MHz at 40.92 MHz, with a resolution of ten bits. Three of the digitized signals from the receiver channels 92–94 are equalized to a reference signal from the receiver channel 91, e.g., by a thirty-two-tap finite impulse response (FIR) filter. These signals are converted to complex form at 20.46 MHz, e.g., with an even/odd commutator and a sixteen-tap FIR filter.

Five satellite trackers are preferably used to simultaneously track a constellation of five navigation satellites which differ from one another in their codes and positions in the sky. At least four satellites must be tracked in order to produce a three-dimensional position determination. The fifth channel collects navigation data from the remaining visible satellites so that new navigation constellations may be acquired when the geometric dilution of position (GDOP) or visibility of the current navigation constellation requires it.

Figure 4:
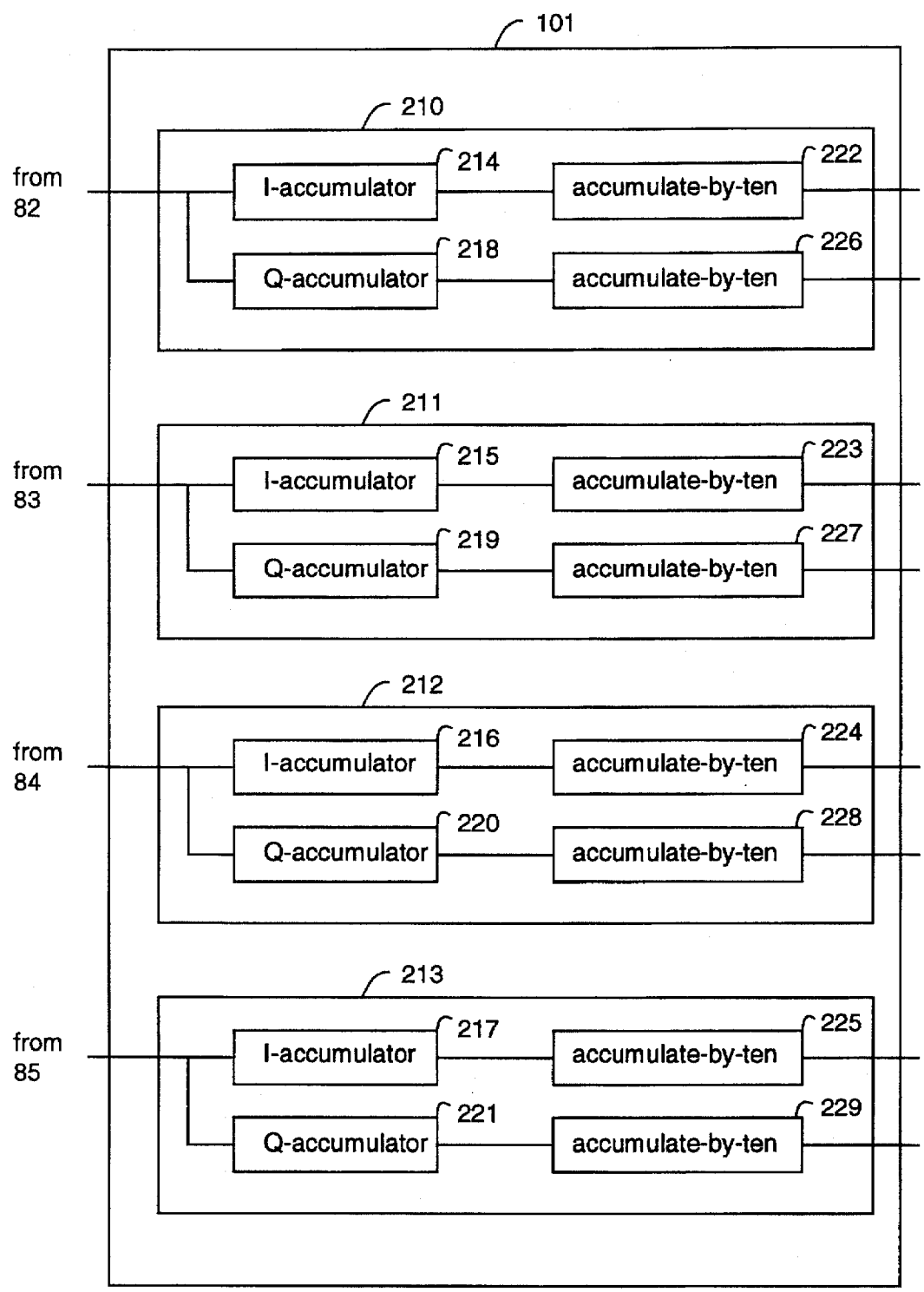
FIG. 4 is a block diagram of the interference data generator included in the system of FIG. 1.

In FIG. 1, each of the five satellite tracking channels is represented by a satellite tracker $100a$–$100e$, and each is connected to receiver channels 91–94. An interference data generator 101 accumulates but does not despread the signals it receives from the receiver channels 91–94. FIG. 4 illustrates the interference data generator 101 in more detail.

Figure 2:
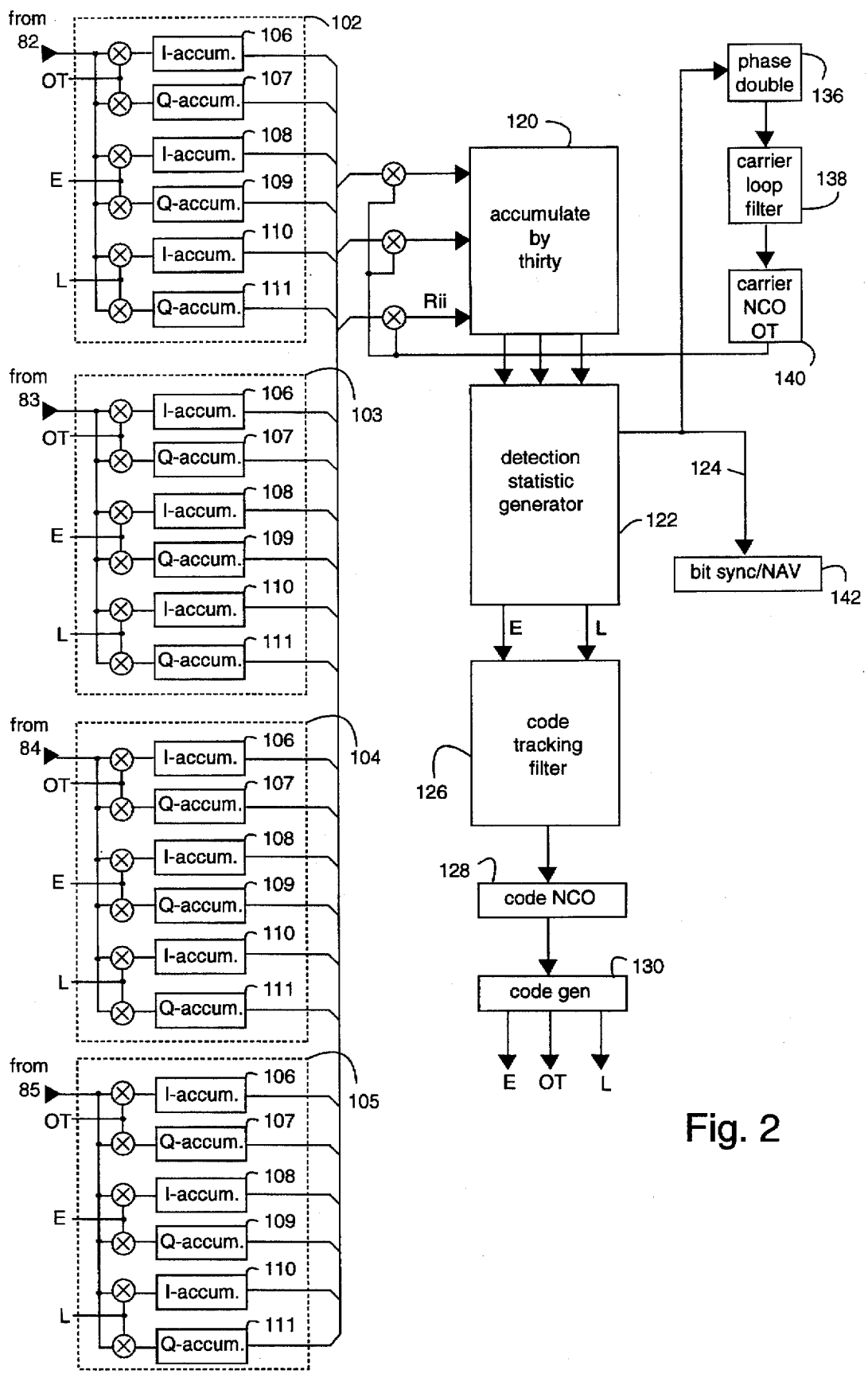
FIG. 2 is a block diagram of typical one of five satellite tracking channels included in the system of FIG. 1.

A block diagram of a typical satellite tracker $100a$–$100e$ is illustrated in FIG. 2. Each satellite tracking channel has a set of four respective complex correlators 102–105 that, in turn, each have a despreader for the early, on-time and late channel. The despreader is simply a multiplier. Each received signal is multiplied by the single bit early, late and on-time locally generated codes that despread the signal. This multiplication is implemented by a two's complementor which changes the sign of the received signal if the local code is a negative one. If the local code is a one, the signal is passed unchanged. The despread signal is then accumulated with an early (E) I-accumulator 106, an early Q-accumulator 107, an on-time (OT) I-accumulator 108, an on-time Q-accumulator 109, a late (L) I-accumulator 110, and a late Q-accumulator 111. For each satellite being tracked, a total of twelve complex (I and Q) early, on-time and late accumulators are used, e.g., one each early, on-time and late accumulation for each of the four receiver channels 91–94. Groups of these accumulators provide data in parallel which is called satellite aperture. This data is partially correlated over sixty-two samples to produce aperture estimates at a 330 KHz rate. Doppler induced motion effects are digitally removed at the 330 KHz rate. The aperture estimates are then further accumulated to reduce their frequency by thirty to form eleven KHz aperture estimates. A separate data path is provided to estimate the interference data. This path does not despread the signal. It simply accumulates each antenna signal by sixty-two and then by ten, to produce thirty-three KHz interference data vectors. The non-despread measurements will allow the interference component of the despread signals to be removed.

The correlators 102–105 have the effect on interference of spreading its energy out. Simultaneously, they enhance the GPS satellite energy by coherently adding the satellite energy over the correlation interval. Aperture focusing, and a final accumulation to one KHz can be implemented with software.

Each of the accumulators 106–111 in complex correlator 102 receives an output from equalizer 82. Each of the accumulators 106–111 in complex correlator 103 receives an output from equalizer 83. Each of the accumulators 106–111 in complex correlator 104 receives an output from equalizer 84. And, each of the accumulators 106–111 in complex correlator 105 receives an output from equalizer 85. Each complex correlator 102–105 provides vectors for an early aperture estimate $A_E$, an on-time aperture estimate $A_{OT}$, and a late aperture estimate $A_L$. An accumulator 120 provides a detection statistic generator 122 with accumulated on-time, early and late aperture estimates. The accumulator 120 accumulates the 330 KHz aperture estimates by thirty to produce an output at an eleven KHz rate. A complex detection statistic is formed, wherein a phase output signal 124 provides for carrier phase tracking. The detection statistic generator 122 provides early (E) and late (L) magnitude signals to a code tracking filter 126 which controls a code numeric controlled oscillator (NCO) 128. Code tracking is similar to that used in conventional receivers, except early, late and on-time detection statistics are used in place of conventional correlations. A code generator 130 is controlled by the code NCO 128 and provides precision-code (P-code) or C/A-code. Early (E), late (L) and on-time codes are produced by the code generator 130, e.g., with a tapped delay line, for despreading by multiplication in each of the correlators 102–105. A pseudo-range signal is output by the code generator 130.

The detection statistic generator 122 includes a computer-implemented method for multiplying the inverse Cholesky Heritian transpose of the interference auto-correlation matrix times the estimated aperture from a cross-correlation operation. At millisecond "k", it forms, $$\alpha_x(k) = R_i^{-1}(k) a_x(k) \tag{1}$$

where, x = early, late or on-time $a_x(k)$ = the early, late or on-time aperture vector at millisecond "k", and $R_i^{-1}(k)$ = the inverse Cholesky factor of the interference autocorrelation matrix at millisecond "k".

The squared magnitude of this vector is referred to herein as the code gated maximum likelihood (CGML) statistic. An early, late and punctual CGML statistic is formed in the detection statistic generator 122 for each of the five satellites being tracked by satellite trackers 100a–100e. The magnitude of $\alpha_E^H(k-1)\alpha_E(k)$ minus the magnitude of $\alpha_L^H(k-1)\alpha_L(k)$ is used to drive the code NCO 128. The phase of $\alpha_{OT}^H(k-1)\alpha_{OT}(k)$ is used to track carrier phase with signal 124.

As is the usual case in spread spectrum correlation, post-despread, the satellite transmission signal power is increased by the square of the processing gain, e.g., the number of correlations. Any interference is also increased by the processing gain to the first power. The integrated post-despread signal power has two components, the satellite transmission signal power and the interference signal power. The satellite transmission signal component of the post-despread and integrated spatial correlation matrix may be expressed mathematically as the outer product of the received satellite signal aperture times the square of the processing gain. The interference component of the spatial correlation matrix is given by the received signal interference spatial correlation matrix $R_{ii}$ times the processing gain. The composite post despread beam-former output power is, satellite signal-enhanced power post beam forming = $W^H R_{x_r x_r} w$ =
$$w^H(R_{ii} PG_1 + a_{SOI} a_{SOI}^H PG_1^2) w, \tag{2}$$

where, PG1 is the processing gain, SOI is the signal of interest, "a", the aperture vector, is a set of complex numbers corresponding to the relative phase $\phi_X$, and amplitude, $A_X$, of the GPS signal on each antenna, $$a = \begin{Bmatrix} A_1 e^{j\phi_1} \\ A_2 e^{j\phi_2} \\ A_3 e^{j\phi_3} \\ A_4 e^{j\phi_4} \end{Bmatrix}, \tag{3}$$

and "w" is the set of complex beamforming weights, $$w = \begin{Bmatrix} w_1 \\ w_2 \\ w_3 \\ w_4 \end{Bmatrix}, \tag{4}$$

and $R_{ii}$ is the interference autocorrelation matrix over "n" samples, $$R_{ii} = \sum_{i=1}^{n} I_i I_i^H, \tag{5}$$

where $I_i$ is the "$i^{th}$" interference data measurement vector made pre-despread, $$I_i = \begin{Bmatrix} I_1(i) \\ I_2(i) \\ I_3(i) \\ I_4(i) \end{Bmatrix}, \text{ and} \tag{6}$$

PG1 is the processing gain, e.g., the number of correlations. The satellite signal-absent power post beamforming is, $$w^H(\hat{R}_{ii} PG_1) w. \tag{7}$$

The CGML method maximizes the ratio of post-despread GPS satellite power to the interference power with respect to the weights, thus maximizing the signal-to-interference-plus-noise ratio (SINR), post beamforming. Taking the ratio of equations (2) and (7) yields the post-despread signal-to-interference-plus-noise ratio, $$\xi(w) = \frac{w^H(R_{ii} PG_1 + a_{SOI} a_{SOI}^H PG_1^2) w}{w^H(\hat{R}_{ii} PG_1) w}, \text{ and} \tag{8}$$

$$\xi(w) = 1 + PG_1 \frac{w^H(a_{SOI} a_{SOI}^H) w}{w^H(\hat{R}_{ii}) w}. \tag{9}$$

This is maximized with respect to the weights to yield the optimal solution, $$\hat{W}_{DMP} = \frac{\max\, imum\{\xi(w)\}}{w \in C^M}, \tag{10}$$

where "a" is the array aperture vector, "$c^M$" means complex in space, $PG_1$ is the processing gain.

The general CGML method finds the beamforming weights "w", which maximize the satellite power to the interference power. The actual CGML detection statistic is one plus the maximum satellite power to interference power.

The CGML method is simplified if a single outer product is used to estimate the numerator of equation (9). The numerator is rank one and the CGML ratio computation is substantially simplified. CGML is obtained by solving for the optimum weight in the equation above with the rank one numerator. The CGML weight is $W_{opt} = R_{ii}^{-1} \hat{a}$. The post-despread and beam-formed data averaged over the dwell period yields, $$CGML = E(a^H w_{opt})_{PG1-e}{}^H R_{ii}^{-1} \hat{a}. \tag{11}$$

Breaking $R_{ii}$ into its Cholesky factors yields, $CGML = a^H R_i^H$
$R_i \hat{a} = \alpha_{(k)}^H{}^* \alpha(k)$, where $R_i$ is the Cholesky factor of $R_{ii}$.

CGML is seen to be the squared magnitude of α(k), and where α(k)=$R_i^{-1}$(k) a(k), where "k" is the millisecond block number. In practice, the processor forms the CGML detection statistic from the current blocks α(k) and the previous block, CGML=$α^H$(k−1)α(k).

The CGML on-time phase is doubled by a phase doubler 136 and is used to feed a carrier loop filter 138 and a carrier NCO 140. Doubling the phase prior to driving the filter eliminates the effect of navigation data transitions from the loop filter. That is, navigation data transitions cause 180° phase transitions. Doubling this causes 360° transition, e.g., no effect. The carrier NCO 140 provides a signal for the pseudo-range rate. The navigation data is provided from one satellite tracking channel only. The CGML on-time phase is doubled and this drives the carrier loop filter and carrier NCO. The NAV data is extracted by a bit sync and NAV extractor 142. The navigation data conventionally includes satellite catalog, orbit ephemeris, health and timing data for the satellites being tracked.

Figure 3:
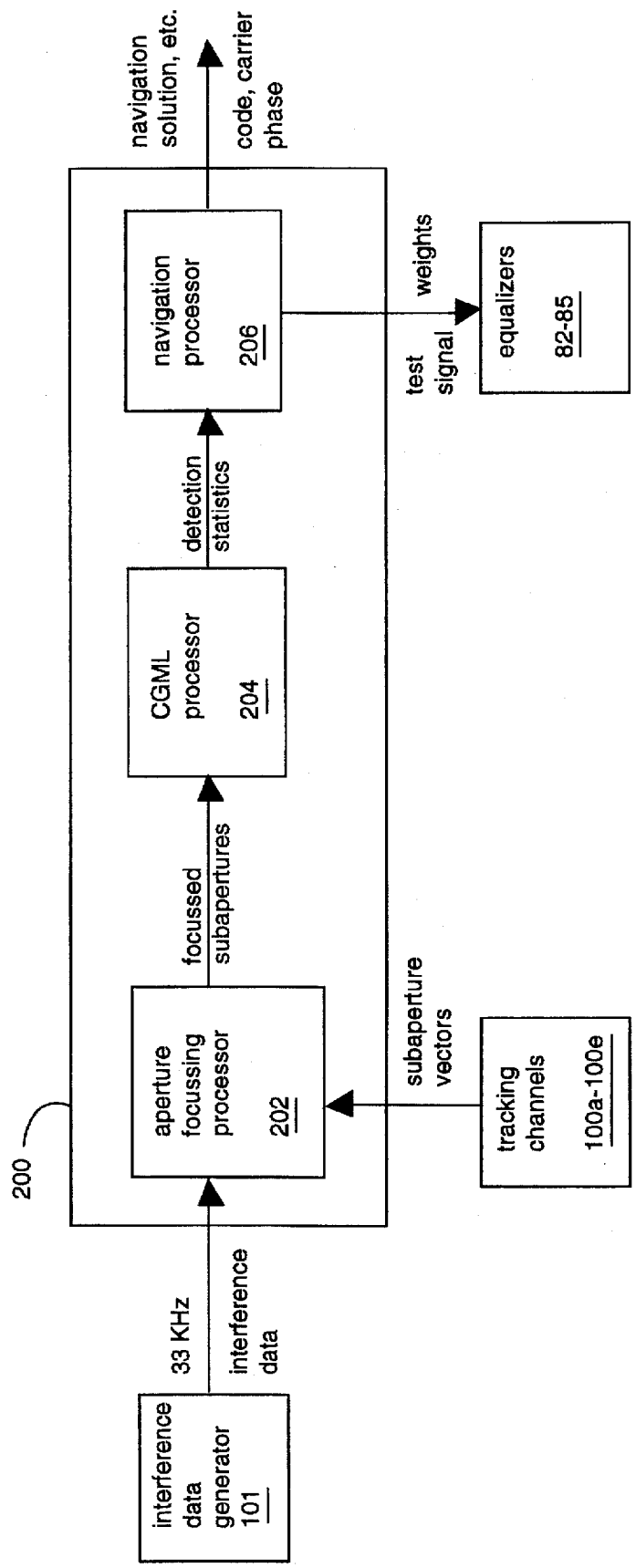
FIG. 3 is a block diagram of a computer hardware and software system that is preferably used to implement several portions of the system of FIGS. 1 and 2.

Preferably, several of the elements of system 10 are implemented by a computer hardware and software system 200, illustrated by FIG. 3. The hardware may comprise a microcomputer, e.g., a Texas Instruments, Inc., (TI) TMS320C40, in which case the software is preferably coded in TMS320C40 assembler. Computer-implemented methods, in the form of program software, are divided amongst an aperture focusing processor 202, a CGML processor 204 and a navigation processor 206. Each one of which is discussed in the next several paragraphs.

Once every few minutes, the navigation processor 206 does an equalizer weight update. The RF input from the antennas 12–15 is interrupted and an internally-generated wideband test signal is fed into the RF chains 91, 92, 93 and 94. Samples at the input to each equalizer 82–85 are buffered and relayed to the navigation processor 206 which then forms the auto-correlation matrix for the reference channel 91. For 32-tap equalizers, the correlation matrix is 32-by-32. Three 32-by-1 cross-correlation vectors between the reference channel 91 and the three other channels 92, 93 and 94 are formed. Each equalizer weight vector is equal to the inverse of the reference channel auto-correlation matrix times the cross-correlation vector to the channel of interest.

"Aperture focusing" refers to the dynamic sweeping of the formed beams and nulls to respond to a rolling platform, e.g., a fighter jet equipped with system 10. Airframe rolling maneuvers cause discrete apertures associated with each jammer and the satellite transmission signal estimates to become "smeared".

The aperture focusing processor 202 mitigates the smearing effects induced by airframe rolling maneuvers. In other words, when the system 10 is mounted to an aircraft it may initially form a proper beam and null for each satellite being tracked, but as the relative three-dimensional positions of the antennas 12–15 rotate with airframe rolling, such beams and nulls depart from their optimums over time. Aperture focusing is intended to match the rolling of the airframe by electronically "rolling" the beams and nulls formed each computation period. The spatial interference auto-correlation matrix can be accurately measured over a microsecond interval, e.g., forty samples at forty MHz. When aircraft rotation is occurring, such matrices will differ, slightly. An aperture focusing process finds the linear mapping ($M_e$) which transforms the spatial interference correlation at the start of a block "k" to match the spatial interference correlation matrix collected at the start of a subsequent block "k+1".

The aperture focusing processor 202 receives eleven on-time, eleven early and eleven late sub-aperture vectors each millisecond (e.g., an eleven KHz rate) from each of the five tracking channels 100a–100e. Each sub-aperture is a four-by-one vector of complex data. Over a collection interval of one millisecond, the subapertures are focused by using a linear interpolation of the focusing matrix, $M_e$=$R_i^{-}$1(k)$R_i$(k+1). Such subapertures are the eleven KHz aperture estimates. The one KHz aperture estimates are referred to herein as simply aperture estimates. Thirty-three corresponding interference data vectors are simultaneously received each millisecond, as shown in FIG. 4. The aperture focusing processor 202 generates from these inputs eleven sub-aperture focusing matrices, focuses one hundred and sixty-five sub-aperture vectors by multiplication by the appropriate focusing matrix, and focuses thirty-three interference data vectors. Eleven each on-time, early and late sub-aperture vectors for each satellite being tracked and the thirty-three interference data vectors are provided each millisecond to the CGML processor 204, e.g., by a TMS320C40 communication channel. A computed Cholesky factor of the interference data from the block "k" is stored in preparation for the next block computation. The focusing matrices are computed after first computing both the Cholesky factor of the current received interference data as well as its inverse. Inverting the Cholesky factor instead of the interference auto-correlation matrix increases the numerical precision for any particular processor.

The CGML processor 204 generates the magnitude and phase of the early, late and on-time modified CGML detection statistic each millisecond for each satellite being tracked, e.g., for five satellites. The magnitude and phase of each of these detection statistics are provided to the navigation processor 206 for code and carrier phase tracking purposes. The CGML processor 204 estimates the inverse Cholesky factor of the interference data each millisecond. The CGML processor 204 receives the on-time, early and late focused sub-apertures from the aperture focusing processor 202 as one hundred and sixty-five floating point numbers each millisecond. Each of the eleven focused subapertures for all fifteen aperture measurements are added together to form fifteen one millisecond focused aperture estimates (e.g., one KHz apertures) that are then mathematically whitened in the voltage domain by the inverse Cholesky factor of the interference data. The inner product of the CGML vector from the current millisecond period update block is formed with a corresponding CGML vector from the previous update block. The magnitude of this result is used for code tracking and the phase of the result is used for carrier tracking by the navigation processor 206. The Cholesky factor of the focused interference data is formed each millisecond and used for all fifteen CGML vectors for the corresponding millisecond update block. The interference data comprises thirty-three complex vectors collected by the hardware over each millisecond integration period. The CGML processor 204 generates the Cholesky factor of the thirty-three vectors of four-by-one complex interference data from the four down converted RF channels of FIG. 1.

The navigation processor 206 provides five basic functions: navigation solution, code and carrier acquisition and tracking, input and output with a host computer interfaced to a user, equalizer weight computation and navigation data extraction management. In particular, the navigation processor 206 preferably provides navigation constellation selection, local level computation, geometric dilution of position (GDOP), C/A-code acquisition, C/A-code to P-code hand-over, cold-warm-hot start capability, baud timing extraction, bit decisions, navigation data framing, message extraction and storage, dual-frequency estimate of ionospheric delays and operation with velocity aiding inputs. Conventional means may be employed successfully for all these functions, so their implementation need not be described here in detail. A new navigation solution is preferably provided by the navigation processor each second. A Kalman filter is used to compute the user velocity, location, clock bias and clock drift parameters.

FIG. 4 shows that the interference data generator 101 comprises four accumulation channels 210–213 respectively connected to receiver channels 91–94 at the outputs of equalizers 82–85. The interference data generator 101 receives all the aperture estimates from a non-despread but accumulated channel and forms an estimate of the non-despread but accumulated received interference data. Thirty-three interference vectors are generated each millisecond. Each accumulation channel 210–213 includes an I-accumulator 214–217 and a Q-accumulator 218–221 that each accumulate by sixty-two. Each accumulation channel 210–213 further includes an I-channel accumulate-by-ten stage 222–225 and a Q-channel accumulate-by-ten stage 226–229, that each output interference data at a thirty-three KHz rate.

Equalization of the radio frequency front-end intermediate frequency and pre-selector filters is important to being able to obtain deep nulls against wideband jammers. The FIR filters are used to simultaneously correct both amplitude and phase mismatches between the radio frequency channels. An equalization weight processor designs thirty-two real weights for each of the three equalized channels. The weights preferably minimize the mean squared error between the filtered output and the reference channel. The reference channel provides an adaptive filter theory "desired signal".

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims are interpreted as covering all alterations and modifications as fall within the true spirit and scope of the invention.

What is claimed is:

1. A radio receiver for simultaneously hulling out an interference signal and enhancing a signal-of-interest that differ at least in their azimuth and/or elevation relative to the receiver, comprising:

an antenna array with "N" number of individual antennas spatially distributed at random and providing for the reception of said interference signal and said signal-of-interest, wherein a first phase difference in the carrier frequency of said interference signal exists between any two antennas that is substantially different than a second phase difference in the carrier frequency of said signal-of-interest for said same two antennas;

multi-channel receiver down-conversion means connected to respective antennas in the antenna array; and combining means connected to the multi-channel receiver down-conversion means for simultaneously hulling out said interference signal and enhancing said signal-of-interest based on said first and second carrier frequency phase differences;

wherein, said interference is determined to be a jammer from a set of pre-despread spatial correlation measurements and that provide for an interference autocorrelation estimate;

the combining means provides for the use of said interference autocorrelation estimate to remove said interference from a post-despread aperture vector, and which leaves only a strong signal-of-interest; and wherein, the antenna array is adaptive and provides for simultaneous maximization of a signal-of-interest and a minimization of both narrowband and wideband jamming interference from a variety of directions that can vary in real-time by providing for an adjustment of a plurality of direct sequence spread spectrum (DSSS) local code phases once a code and a code phase lock have been achieved to effectively aim an antenna-array-reception-pattern null in a direction of a jammer.

2. The receiver of claim 1, wherein:

the antenna array provides for the reception of L-band microwave radio transmissions from orbiting navigation satellites as said signal-of-interest and said interference signal includes transmissions from a jammer;

wherein, copies the GPS space vehicles based on the vector correlation with the GPS code for that space vehicle (SV).

3. A radio receiver for simultaneously nulling out an interference signal and enhancing a signal-of-interest that differ at least in their azimuth and/or elevation relative to the receiver, comprising:

an antenna array with individual antennas spatially distributed and providing for the reception of said interference signal and said signal-of-interest, wherein a first phase difference in the carrier frequency of said interference signal exists between any two antennas that is substantially different than a second phase difference in the carrier frequency of said signal-of-interest for said same two antennas;

multi-channel receiver down-conversion means connected to respective antennas in the antenna array;

combining means connected to the multi-channel receiver down-conversion means for simultaneously nulling out said interference signal and enhancing said signal-of-interest based on said first and second carrier frequency phase differences;

the antenna array provides for the reception of L-band microwave radio transmissions from orbiting navigation satellites as said signal-of-interest and said interference signal includes transmissions from a jammer;

the multi-channel receiver down-conversion means provides for code and carrier tracking of direct sequence spread spectrum (DSSS) types of transmissions in said L-band microwave radio transmissions;

the combining means includes aperture estimate formation means including in-phase (I) and quadrature (Q) despreaders and accumulators for early, late and punctual correlation of said DSSS transmissions, wherein said despreaders and accumulators provide for a continuous output of aperture estimates; and the combining means further comprises a code-gated maximum-likelihood (CGML) processor connected to the multi-channel receiver down-conversion means for whitening said aperture estimates with means for taking an inverse Cholesky factor of a pre-despread interference data, wherein the magnitude of a resulting products provide for code tracking and the phase of the result provides for carrier tracking.

4. The receiver of claim 3, further comprising:

a navigation processor connected to the CGML processor and providing for three-dimensional position solutions in the presence of severe interference from said jammer.

5. The receiver of claim 3, further comprising:

an aperture processor connected to receive said aperture estimates and the CGML processor and providing for the generation of focusing matrices and a focusing of said aperture estimates by a multiplying a respective one of said focusing matrices and interference data vectors, wherein the combining means is provided with data for simultaneously nulling-out said interference signal and enhancing said signal-of-interest based on said first and second carrier frequency phase differences when the antenna array is rolling and/or tumbling relative to said signal sources.

6. A navigation satellite receiver for nulling-out interference and enhancing satellite signals by using differences in the spatial positions of the signal sources, comprising:

a plurality of antennas in a spatial array providing for the reception of L-band microwave radio transmissions from orbiting navigation satellites and subject to interference from jammers;

a plurality of amplitude-balanced and phase-balanced receiver downconverter channels one each respectively connected to individual ones of the plurality of antennas;

a plurality of satellite tracking channels each one connected to every one of the plurality of receiver channels and each including in-phase (I) and quadrature (Q) despreaders and accumulators for early, late and punctual correlation, wherein said despreaders and accumulators provide four-by-one vectors as aperture estimates; and a code-gated maximum likelihood (CGML) processor connected to the satellite tracking channels for voltage-domain whitening of said aperture estimates by an inverse Cholesky factor of a pre-despread interference data, wherein the magnitude of a resulting product provides information for code tracking and the phase of the result provides information for carrier tracking.

7. The receiver of claim 6, further comprising:

a navigation processor connected to the CGML processor and providing for three-dimensional position solutions in the presence of severe interference from said jammers.

8. The receiver of claim 6, further comprising:

an aperture focusing processor connected to the plurality of satellite tracking channels and providing for an aperture focusing process to find a linear mapping ($M_e$) that transforms a spatial interference correlation at a start of a block "k" to match a spatial interference correlation matrix collected at a start of a subsequent block "k+1", wherein subapertures collected over an interval are focused by multiplication with linear interpolations of a focusing matrix.

9. The receiver of claim 8, wherein:

the aperture focusing processor is connected to receive on-time, early and late sub-aperture vectors periodically from each of a plurality of satellite tracking channels and corresponding interference data vectors from an interference estimator, and connected to output a plurality of sub-aperture focusing matrices, to focus sub-aperture vectors by multiplication by an appropriate focusing matrix, and focus a plurality of interference data vectors.

10. The receiver of claim 9, wherein:

the aperture focusing processor is further connected to output on-time, early and late sub-aperture vectors and interference data vectors, for each satellite being tracked, each millisecond to the CGML processor, wherein a computed Cholesky factor of an interference data from a block "k" is stored in preparation for a next block computation, and said focusing matrices are computed after first computing both a Cholesky factor of a current received interference data as well as its inverse.

11. The receiver of claim 6, further comprising:

a navigation processor connected to receive the magnitude and phase of a plurality of CGML detection statistics from the CGML processor for code and carrier phase locking and providing for three-dimensional position solutions in the presence of severe interference from said jammers; and an aperture focusing processor connected to the plurality of satellite tracking channels and providing for an aperture focusing process to find a linear mapping ($M_e$) that transforms a spatial interference correlation at a start of a block "k" to match a spatial interference correlation matrix collected at a start of a subsequent block "k+1" that periodically outputs to the CGML processor a plurality of on-time, early and late focused subapertures, wherein subapertures collected over an interval are focused by multiplication with linear interpolations of a focusing matrix.

12. The receiver of claim 6, wherein:

the CGML processor is connected to generate a magnitude and a phase of a plurality of early, late and on-time modified CGML detection statistics each millisecond for each satellite being tracked, and the magnitude and phase of each of said detection statistics is provided to the navigation processor for code and carrier phase tracking purposes, wherein the CGML processor estimates an inverse interference auto-correlation matrix each millisecond.

13. The receiver of claim 12, wherein:

the CGML processor includes means for receiving a plurality of on-time, early and late focused subapertures from the aperture focusing processor 202 and for adding them together to form a plurality of focused aperture estimates that are then mathematically whitened in the voltage domain by an inverse Cholesky factor of an interference data, wherein the inner product of a CGML vector from a current millisecond period update block is formed with a corresponding CGML vector from a previous update block.

* * * * *